United States Patent
Brannick et al.

(12)

(10) Patent No.: US 6,289,300 B1
(45) Date of Patent: Sep. 11, 2001

(54) INTEGRATED CIRCUIT WITH EMBEDDED EMULATOR AND EMULATION SYSTEM FOR USE WITH SUCH AN INTEGRATED CIRCUIT

(75) Inventors: Dara Joseph Brannick, Claremorris; Patrick Michael Mitchell, Killaloe; Timothy J. Cummins, Cratloe; Brian John O'Mara, Grange, all of (IE)

(73) Assignee: Analog Devices, Inc., Norwood, MA (US)

(*) Notice: Subject to any disclaimer, the term of this patent is extended or adjusted under 35 U.S.C. 154(b) by 0 days.

(21) Appl. No.: 09/019,943

(22) Filed: Feb. 6, 1998

(51) Int. Cl.[7] .................................................. G06F 9/455
(52) U.S. Cl. .................................. 703/28; 703/23; 710/7; 714/30; 714/35
(58) Field of Search .................. 395/500.44, 500.49; 703/23–25, 28; 710/7; 714/30, 33.35

(56) References Cited

U.S. PATENT DOCUMENTS

| | | |
|---|---|---|
| 4,272,760 | 6/1981 | Prazak et al. .................... 341/120 |
| 4,476,531 | 10/1984 | Marino et al. . |
| 5,111,425 | 5/1992 | Takeuchi et al. . |
| 5,212,795 | 5/1993 | Hendry . |
| 5,224,070 | 6/1993 | Fandrich et al. . |
| 5,242,848 | 9/1993 | Yeh . |
| 5,313,618 | 5/1994 | Pawloski .................... 395/500.49 |
| 5,375,218 | 12/1994 | Umeda . |
| 5,375,228 | 12/1994 | Leary et al. .................... 395/183.09 |
| 5,426,769 | 6/1995 | Pawloski . |
| 5,467,200 | 11/1995 | Ohsawa et al. . |
| 5,483,239 | 1/1996 | Arczynski et al. . |
| 5,488,688 | 1/1996 | Gonzales et al. . |
| 5,504,684 | 4/1996 | Lau et al. . |
| 5,515,320 | 5/1996 | Miwa . |
| 5,535,357 | 7/1996 | Moran et al. . |

(List continued on next page.)

FOREIGN PATENT DOCUMENTS

| | | |
|---|---|---|
| 0 592 069 B1 | 4/1994 | (EP) . |
| 0 757 356 A1 | 2/1997 | (EP) . |
| 08 293566 | 5/1996 | (JP) . |
| WO 97/30452 | 8/1997 | (WO) . |

OTHER PUBLICATIONS

Motorola DSP56100 Technical Data, Sect. 10, On–Chip Emulation (OnCE) [online], Motorola Co., 1996 (retrieved Aug. 10, 1999).

Motorola Dig. Sig. Proc. Application Dev. Sys. User's Manual, Sections 1–5 [online], Motorola Co., Aug. 13, 1997.

Motorola, DSP65100 Technical Data, Section 10, On–Chip Emulation (OnCE) [on–line], Motorola Corp., Oct. 7, 1996 [retrieved on Jul. 8, 1999]. Retrieved from the internet at http://www.mot.com/pub/SPS/DSP/LIBRARY/56100/FM_REV0/10.PDF.*

"Data acquisition chip offers sensor–to–system solution", Electronic Products, Jan. 1999, pp. 39–40.

(List continued on next page.)

Primary Examiner—Kevin J. Teska
Assistant Examiner—Douglas W. Sergent
(74) Attorney, Agent, or Firm—Wolf, Greenfield & Sacks, P.C.

(57) ABSTRACT

A data processor is provided with an embedded debugger. The debugging function is provided by the execution of a debugging program which is stored in reserved, non-volatile memory which is internal to the data processor. During the debug mode, the data processor allows the internal registers used during execution of a user program to be examined. Debug operation can be initiated via debug instruction which replaces an existing instruction in the user code, the replaced instruction being held in a special purpose register such that it can be executed on return from the debug mode. Single step operation of the data processor can be performed in debug mode and data and instructions can be exchanged with the data processor in debug mode, optionally via a single pin so as not to sacrifice any user resources.

54 Claims, 7 Drawing Sheets

U.S. PATENT DOCUMENTS

| | | | |
|---|---|---|---|
| 5,581,695 | * | 12/1996 | Knoke et al. .......................... 714/28 |
| 5,627,784 | | 5/1997 | Roohparvar . |
| 5,630,164 | | 5/1997 | Williams et al. . |
| 5,651,128 | | 7/1997 | Gaultier . |
| 5,752,077 | * | 5/1998 | Yiu et al. ................................ 710/7 |
| 5,758,059 | * | 5/1998 | Alexander ...................... 395/183.06 |
| 5,767,729 | | 6/1998 | Song . |
| 5,768,194 | | 6/1998 | Matsubara et al. . |
| 5,796,139 | | 8/1998 | Fukase . |
| 5,805,865 | * | 9/1998 | Mimura et al. ................. 395/500.49 |
| 5,848,026 | | 12/1998 | Ramamurthy et al. . |
| 5,857,094 | | 1/1999 | Nemirovsky . |
| 5,862,073 | | 1/1999 | Yeh et al. . |
| 5,872,954 | | 2/1999 | Matsushita . |
| 5,873,112 | | 2/1999 | Norman . |
| 5,889,480 | | 3/1999 | Kim . |
| 5,898,862 | | 4/1999 | Vajapey . |
| 5,900,008 | | 5/1999 | Akao et al. . |
| 5,901,330 | | 5/1999 | Sun et al. . |
| 5,937,423 | | 8/1999 | Robinson . |
| 5,953,255 | | 9/1999 | Lee . |
| 5,956,277 | | 9/1999 | Roohparvar . |
| 5,963,473 | | 10/1999 | Norman . |
| 5,989,960 | | 11/1999 | Fukase . |
| 6,009,496 | | 12/1999 | Tsai . |

OTHER PUBLICATIONS

Leonard, Milt, "Self–programming microcontroller networks sensors and transducers", Electronic Design, Feb. 9, 1998, pp. 92,94.

"Ikos Grabs Emulation Firm, VMW", Electronic Engineering Times, pp. 1, Mar. 18, 1996.

Babb et al, "Virtual Wires: Overcoming Pin Limitations in FPGA–based Logic Emulators", Proc. IEEE Workshop on FPGAs for Custom Comp. Machines, pp. 142–151, Apr. 1993.

Babb et al, "Logic Emulation with Virtual Wires", IEEE Trans on Computer–Aided Design of Int. Circuits and Systems, vol. 16, Issue 6, pp. 609–626, Jun. 1997.

Babb et al, "The RAW Benchmark Suite: Computation Structures for General Purpose Computing", Proc. $5^{th}$ Ann. IEEE Symp. on Field–Programmable Custom Computing Machines, pp. 134–143, Apr. 1997.

Dahl et al, "Emulation of the SPARCLE Microprocessor with the MIT Virtual Wires Emulation System", Proc. IEEE Workshop FPGAs for Custom Comp. Machines, pp. 14–22, Apr. 1994.

Clinton Kuo et al, "A 512–kb EEPROM Embedded in a 32–b Microcontroller", IEEE, Journal of Solid State Circuits, vol. 27, No. 4, Apr. 1992, pp. 574–581.

* cited by examiner

Prior Art

EMUCON Register (EMUCON)

| CLKD | | | EE | EES | ESS | EAIN | EAOUT |
|---|---|---|---|---|---|---|---|
| 0 | 0 | 0 | 1 | 0 | 0 | 0 | 1 |
| R/W | R/W | R/W | R/W | R/W | R/W | R | R/W |

Fig. 8

INTEGRATED CIRCUIT WITH EMBEDDED EMULATOR AND EMULATION SYSTEM FOR USE WITH SUCH AN INTEGRATED CIRCUIT

TECHNICAL FIELD

The present invention relates to an integrated circuit having an emulator embedded therein, and to an emulation system for use with such an integrated circuit.

BACKGROUND OF THE INVENTION

Executable code for a data processor such as a microcontroller, requires testing and correction during its development cycle. Software debugging is initially done in a simulator or debugger offline. Once the software is debugged, it is then down loaded into the target system. However, if the software does not work correctly, for example, due to a timing problem it is then necessary to do an "in circuit" examination of the software and the data that it is manipulating. It is known to perform this by removing the target data processor and replacing it with a replica of the data processor which can be probed or interrogated via an emulation pod. The replica data processor emulates the real data processor and this process is called "in circuit emulation".

A disadvantage of known "in circuit" emulators is that the additional sockets, clips, adaptors or pods can induce extra parasitic components into the target system which alter its performance. This usually restricts the emulation to a slow speed in order to avoid timing problems introduced by the parasitic components. The use of such in circuit emulators can cause problems where debugging is to be performed in hybrid digital-analogue systems where analogue accuracy is a critical issue, especially when more than 6 or 7 bit resolution of analogue variables is used.

It was also known, in the cases of microcontrollers where the internal address and data busses do not come out to the pins of the data processor, to produce a special "bond-out" version of the circuit. This has to be manufactured into a bigger package to bring these extra signals to the pins so that the emulator can monitor them. The bond-out version is disadvantageous since it requires the chip manufacturer to create a second version of the chip and package, with consequent timing differences from the real chip, increased complexity, and a need to provide an adaptor for connecting the "bond-out" version of the chip to target systems in place of the standard chip package.

It is known to integrate emulation address comparators and emulsion break point registers within an integrated circuit and then to perform a hardware compare of the contents of the address register with the emulation break point register in order to determine when to force a break point for emulation purposes. However, the additional registers and comparators are wasteful of space on the silicon die of the integrated circuit, and are inflexible in the operation. An additional register and comparator is required for each break point. Typically a designer may wish to have between eight and sixteen break points available. The addition of sixteen or so additional registers and comparators can add a significant cost to the production cost of the integrated circuit.

SUMMARY OF THE INVENTION

According to a first aspect of the present invention, there is provided a data processor including an emulation controller for causing the data processor to enter an emulation mode, and dedicated registers for use in the emulation mode.

It is thus possible to provide a software driven emulator within a data processor which leaves the registers used by the data processor to execute tasks unaltered during an emulation or debug operation. A software driven emulator is flexible and allows, for practical purposes, for an unlimited number of break points to be implemented.

Preferably the registers dedicated for use by a data processing core (also known as an arithmetic logic unit) of the data processor during emulation can only be altered during emulation.

Advantageously a programme for controlling the operation of the data processing core during emulation is stored in a reserved non-volatile memory area which is hidden from the user of the data processor.

Preferably the emulation controller can operate in a single step mode wherein the register status of the data processor, or other information such as the contents of a stack or memory can be output after executing a single instruction of the user's programme. Additionally or alternatively, the emulation controller is responsive to a single byte instruction placed in the user code in order to initiate the emulation mode. The single byte instruction is, in general written over another instruction in the user's programme. In order to ensure that the user's program performs as intended, the overwritten instruction is held in a special purpose register so that it is executed when the emulation mode is exited. Additionally or alternatively, the data processor may also be responsive to a signal on one of the data processor control pins in order to initiate the emulation mode.

According to a second aspect of the present invention, there is provided a data processor having an emulator embedded therein, and in which the emulator is initiated by a single word instruction.

According to a further aspect of the present invention, there is provided a data processor including an emulator therein arranged to communicate information concerning the internal status of the data processor via a serial communication link.

Preferably the serial data link utilises a pin in the data processor package. Advantageously the pin is multiplexed with a control function of the data processor. For example, some data processors include control pins which are only relevant during the power up initialisation of the data processor. The pin may indicate to the processor whether it is to initially execute instructions from an internal or an external memory. Once this information has been conveyed to the processing core of the data processor the pin becomes effectively redundant. Such a pin may then be used as a communication link between the embedded emulation system within the data processor and an external development system or emulator controller.

Preferably the emulator is responsive to a signal on the pin, such as a voltage transition, in order to activate the emulator.

Preferably the emulator is a software controlled emulator, and comprises emulation instructions held as software within a reserved memory integrated into the data processor. The receipt of the instruction to start emulsion, either by a signal on the emulator control pin or via a software instruction within the software being debugged, forces the data processing core of the data processor to suspend execution of the user's programming code and to execute instructions from the emulation instruction code. Preferably the receipt of an instruction to commence emulation causes a high level non maskable interrupt to be issued to the data processing core of the data processor.

Preferably the data processor executes emulation instructions using reserved emulation registers, thereby leaving the contents of the registers used for programme code execution unaltered, except possibly for the programme address controller and the stack which may experience some minor and wholly reversible alterations. Advantageously an auxiliary stack and/or auxiliary programme address counters may also be provided solely for use within the emulation routine such that the registers, programme counter and stack used by user executable code may be left entirely unaltered. As an alternative dedicated registers may also be provided for storing the contents of the program address controller. In yet a further alternative, the data processor may be arranged to down load the stack and register contents to virtual registers with an emulator control data processor or within an interface element, and to up load the register and stack contents when exiting the emulation mode. According to a further aspect of the present invention, there is provided a development system comprising a control data processor for monitoring the status of a target data processor, wherein the target data processor includes an embedded emulator for communicating information concerning the internal status of the target data processor via a serial communications link, the development system including interface element adapted to communicate via the serial communications link.

The interface element may be in the form of a pod providing electrical isolation between the target and control data processor. Advantageously the pod provides bi-directional communication between the target and control data processors and includes a controllable voltage generator for causing a voltage transient on an emulation control pin of the target data processor for forcing it to enter the emulation mode. The voltage generator may also be used to communicate data and instructions to the target data processor.

Advantageously the interface element communicates with the control data processor via a conductive link, such as a cable. Alternatively, the communications pod may communicate with the control data processor over a radio or optical based, such as infra-red, communications link. Advantageously the or each communications pod has a unique identity such that a plurality of pods may be independently addressed by a single emulation control data processor. Thus the emulation control data processor can control and/or debug a plurality of target data processors within a target system.

Advantageously the or each interface element contains a local data processor for handling any timing features or handshaking required to communicate over the data link. The local data processor may contain registers or memory for temporarily storing the register contents of an associated target data processor, or may handle the modification of a block user program code, ie changing the code or inserting a break point instruction.

In a preferred embodiment, the or each interface element is a pod having three pins, one for connection to ground, one for connection to the power rail Vcc, and one for connection to the pin on the target data processor for communication therewith.

It is thus possible to integrate emulation and debug features with a data processor, thereby ensuring that emulation has minimal effect on the operation of the target board.

As used herein, emulation includes software debugging carried out using the target processor.

BRIEF DESCRIPTION OF THE DRAWINGS

The present invention will further be described, by way of example, with reference to the accompanying drawings, in which:

FIG. 8 shows a layout of a special purpose emulation register; and

DESCRIPTION OF THE PREFERRED EMBODIMENT

Figure 1:
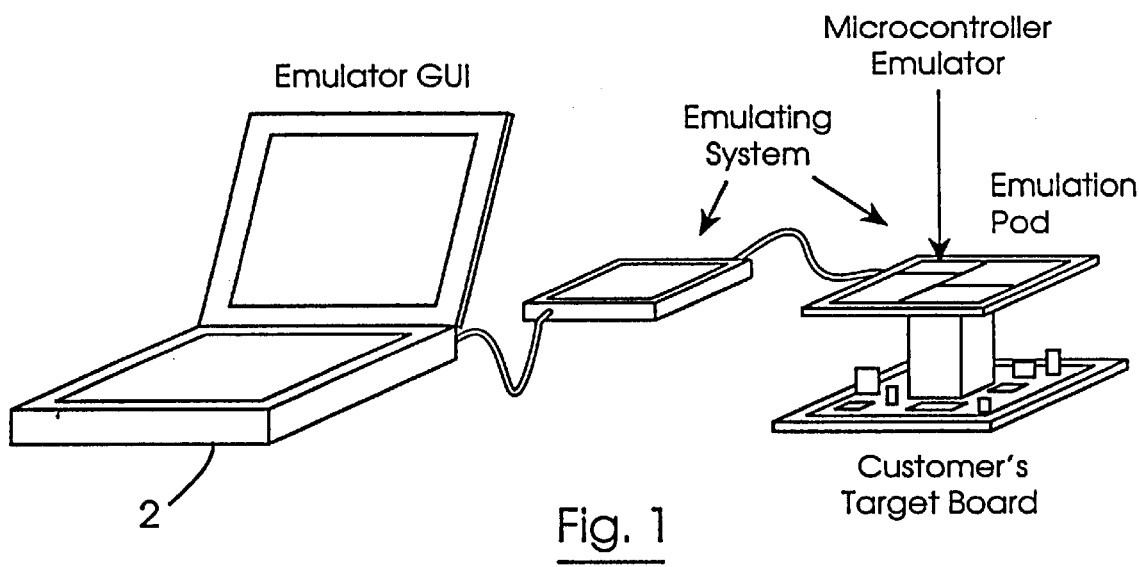
FIG. 1 schematically illustrates a prior art emulator arrangement.

FIG. 1 schematically illustrates a prior art emulator in which a large emulation pod plugs into the data processor socket on a customer's target board in order to provide interconnection with an emulator system comprising an emulation control processor running an emulator software package which typically displays register contents of the target processor and allows for editing of instructions via a graphical user interface (GUI). The large size of the emulation pod makes it inconvenient to use and also can give rise to subtle changes in operation of the target board due to the extra load and parasitic components introduced by the emulation pod. Furthermore, the known emulation pod uses a different or modified data processor which gives rise to changes in output driver characteristics and loadings which can effect signal timings and degrade analogue performance where analogue circuits or DAC or ADC's are involved.

Figure 2:
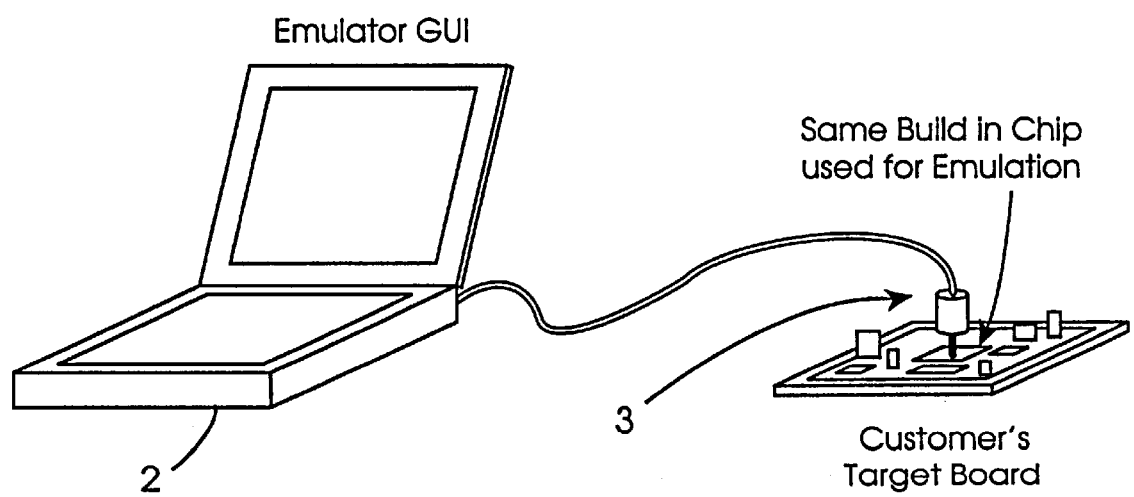
FIG. 2 schematically illustrates an emulator constituting an embodiment of the present invention.

As shown in FIG. 2, an emulation system comprising a data processor constituting an embodiment of the present invention and an interface card 3 for providing galvanic isolation between the customer's target board and the emulation control data processor 2 provides for a more compact emulation system and, more importantly does not change the operating characteristics of the customer's target board due to the introduction of parasitic components.

Figure 3:
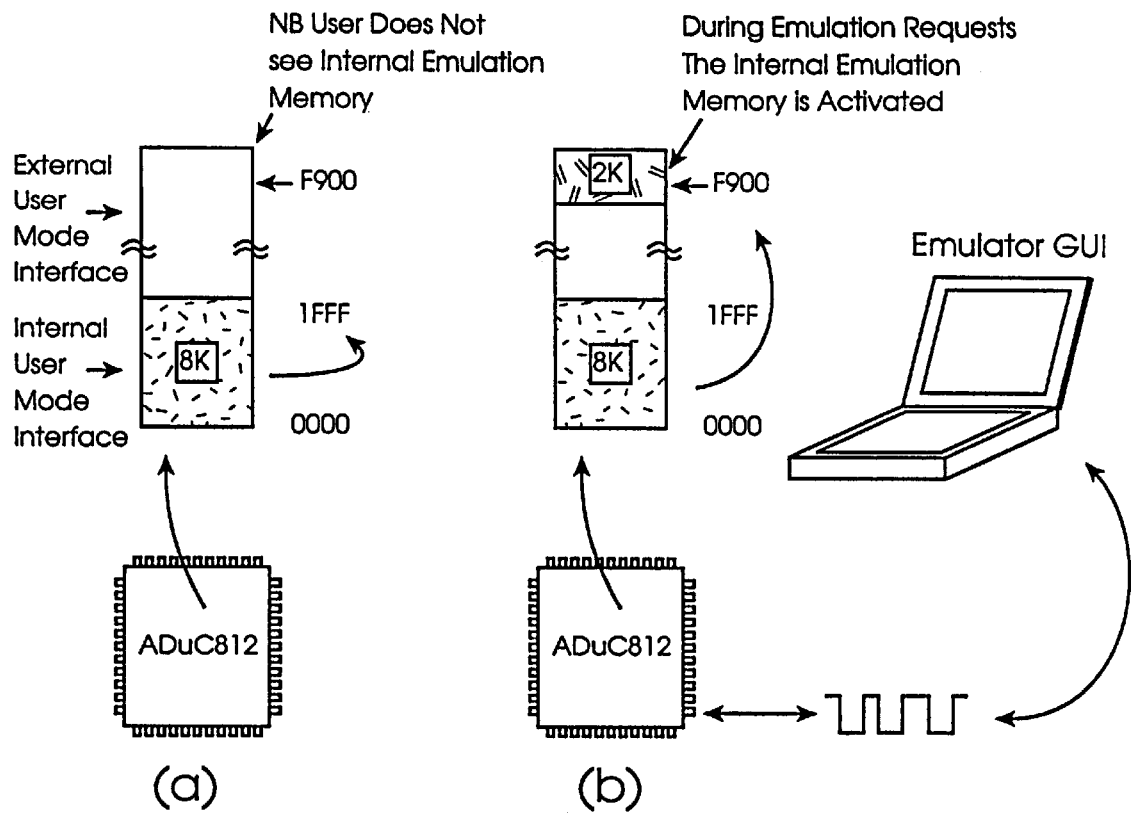
FIGS. 3a and 3b schematically illustrate the memory organisation within a data processor constituting an embodiment of the present invention in normal operation and in emulation mode, respectively.

The data processor having an emulator according to the present invention performs emulation under software control. In order to achieve this a reserved memory containing emulation instructions is provided as an integral part of the data processor. As shown in FIG. 3a, a data processor may have, for example, a memory space in which address 000H to 1FFFH (where "H" indicates that the addresses are expressed in hexadecimal) are provided for internal user programme code and the addresses 2000H to FFFFH are allocated to external user code space. The emulation memory is placed on another page of memory such that it remains hidden from the user. Thus, for example, external memory addresses F900H to FFFFH may contain a user programme, whereas internal addresses F900H and above contain the emulation programme.

Figure 4:
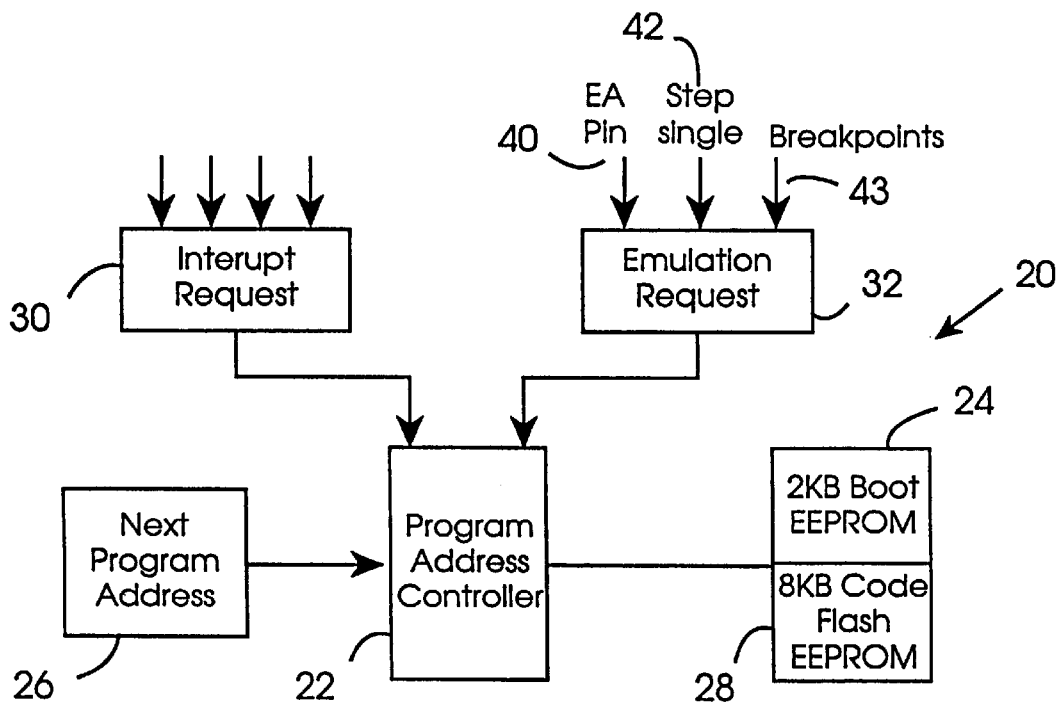
FIG. 4 schematically illustrates the internal layout of a microcontroller constituting an embodiment of the present invention.

FIG. 4 schematically illustrates the internal arrangement of a data processor, generally illustrated as 20, whereby a programme address controller 22 holds the address of the next memory location to be read from. This location normally points to a boot strap memory 24 which contains executable code to be used during power up sequences or for data exchange routines, or to a user programme 26 which may be stored in an internal user code memory 28 or in external memory (not shown). The programme address controller 22 is responsive to an interrupt request handle 30 which, as is well known in the art, allows normal execution of a programme to be interrupted in order to respond in a predetermined way to specific events. The data processor is arranged to execute an interrupt routine in response to an interrupt request and then to return to the user code when the interrupt routine has been completed. The data processor constituting an embodiment of the present invention is also provided with an emulation request controller 32 which issues a priority non-maskable interrupt request which takes precedence over all other interrupt functions. The interrupt controller 30 is arranged to buffer incoming interrupts while the programme address controller is responsive to the emulation request controller 32 in order to ensure that interrupt requests are properly serviced upon return from the emulation mode.

The emulation request controller is responsive to three inputs. A first input 40 is responsive to a voltage transition on a single pin of the data processor package. In the preferred embodiment, the pin is a "EA" pin (provided on an ADUC812 data processor) which is used to tell the data processor and it should execute from internal (EA=high) or external (EA=low) memory during the power up. The state of the pin is latched by the data processor at power up or reset and thereafter it can be used as the emulation control pin. The EA pin is also used, when emulation has been initiated, as a bi-directional serial communications pin.

The emulation request controller is also responsive to a single step flag 42 which ensures that an emulation request occurs after execution of a single instruction of the user programme code. Preferably, the emulation controller 32 is responsive to a break point instruction 43 whose occurrence in the user code causes the emulation controller 32 to issue an emulation request.

Figure 5:
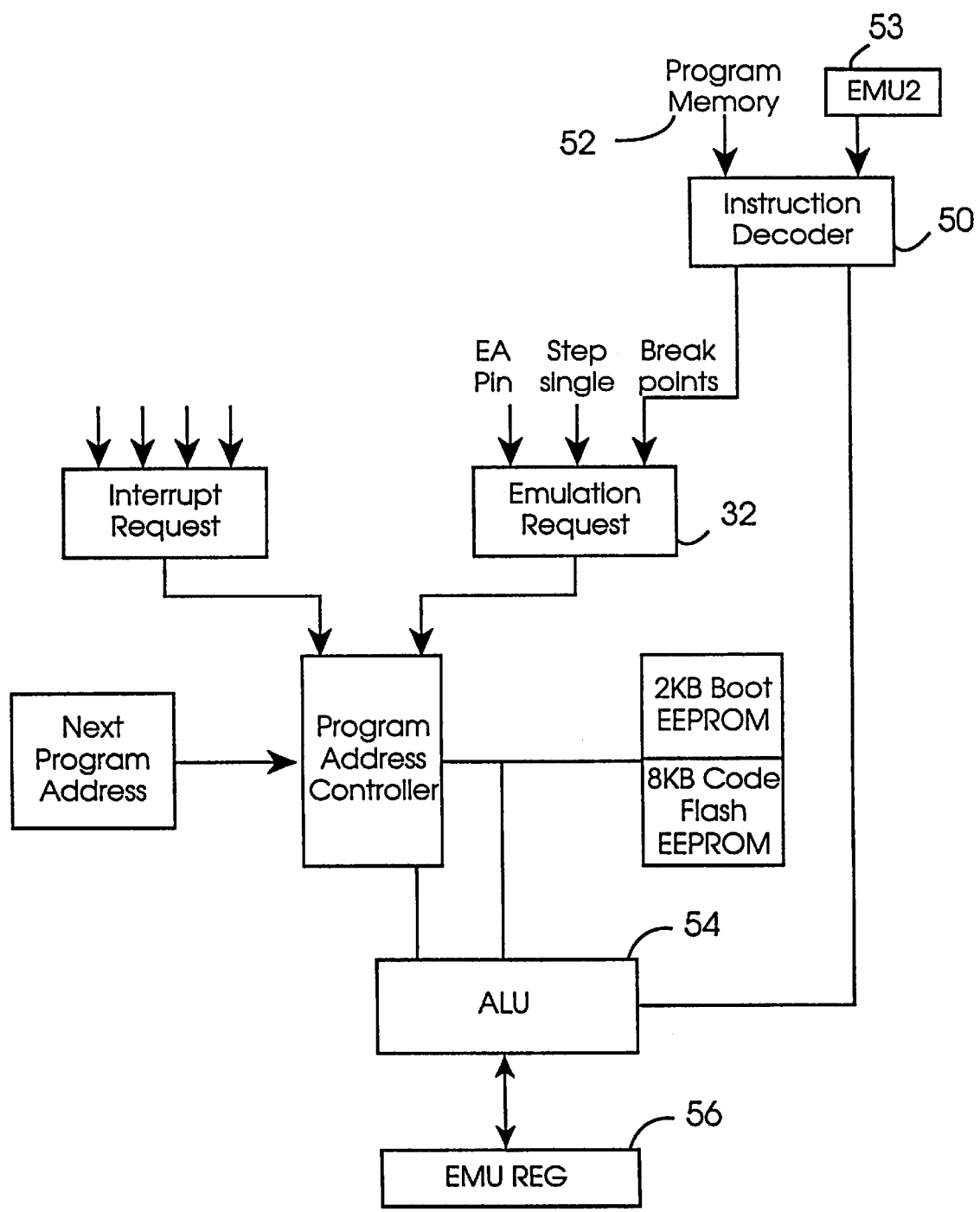
FIG. 5 schematically illustrates the internal layout of a microcontroller constituting a further embodiment of the present invention.

As shown in FIG. 5, a break point instruction decoder 50 is provided to specifically handle the occurrence of the additional single byte emulation instruction (break point instruction) contained within user programme memory 52, which may be external memory or, more likely, internal memory area 28. Additionally, a special register EMU2 53 is provided to hold the instruction which was overwritten by the emulation request instruction thereby ensuring that the addresses of the remaining programme code are unaltered. As shown in FIG. 5, the data processing core 54 (also known as an arithmetic logic unit ALU) has a dedicated set of reserved registers 56, EMUCON, EMU1 and EMU2, for use during emulation. The reserved register set may also include an alternative stack and/or programme counter for use during emulation.

FIG. 8 illustrates the emulation control register, EMUCON, provided within a data processor including an embedded software controlled emulator. Working from the left to right, the first three bits of the register form a control word which causes internal timers and clocks of the data processor to be disabled if the correct code, in this example 101, is written into these bits of this special function register. This enables the emulator to halt internal timers and interrupts when executing an emulation function. The fourth bit is an emulation enable bit, EE, which is placed in the enable condition by default and enables emulation to be started when an appropriate emulation request is received by the emulation request controller. The fifth bit enables execution of the contents of the special function register EMU2. When an emulation routine is started by the occurrence of the emulation break point in the user programme code, this EES register is inspected in order to determine whether the break point instruction should actually be executed. If the contents of this register are not set, then the emulation will be performed. When the emulation routine is completed, the address pointer points to the address of the break point. As mentioned earlier, the original instruction which was overwritten by the break point is loaded into the EMU2 special function register and the bit EES is cleared. As the emulation programme returns control to user code, it sets the EES bit. The address programme counter will return control at the address of the break point instruction. However, this time the EES bit is set and instead of re-executing the emulation routine, the processing core of the data processor is caused to execute the instruction held in the EMU2 special function register. The EES bit is then toggled once the instruction in the EMU2 register is executed, thereby ensuring that the next occurrence of the break point instruction will cause the emulation routine to be re-entered.

The sixth bit is an emulation single step, ESS bit which causes the data processor to only execute single instructions between emulator programme operations.

The final two bits EA-in and EA-out enable the status of the EA pin to be read and written to respectively.

FIGS. 6a to 6d schematically illustrate operation of the emulator in a single step code execution mode. The emulation routine takes advantage of the fact that the emulation interrupt will not respond until at least one instruction of the user code has been executed. Thus once control has been passed from the emulator to the user code, the emulator issues, via a hardware resource, a highest priority non-maskable interrupt that ensures that programme execution is immediately returned to the emulator, irrespective of what instruction was being performed.

Figure 6:
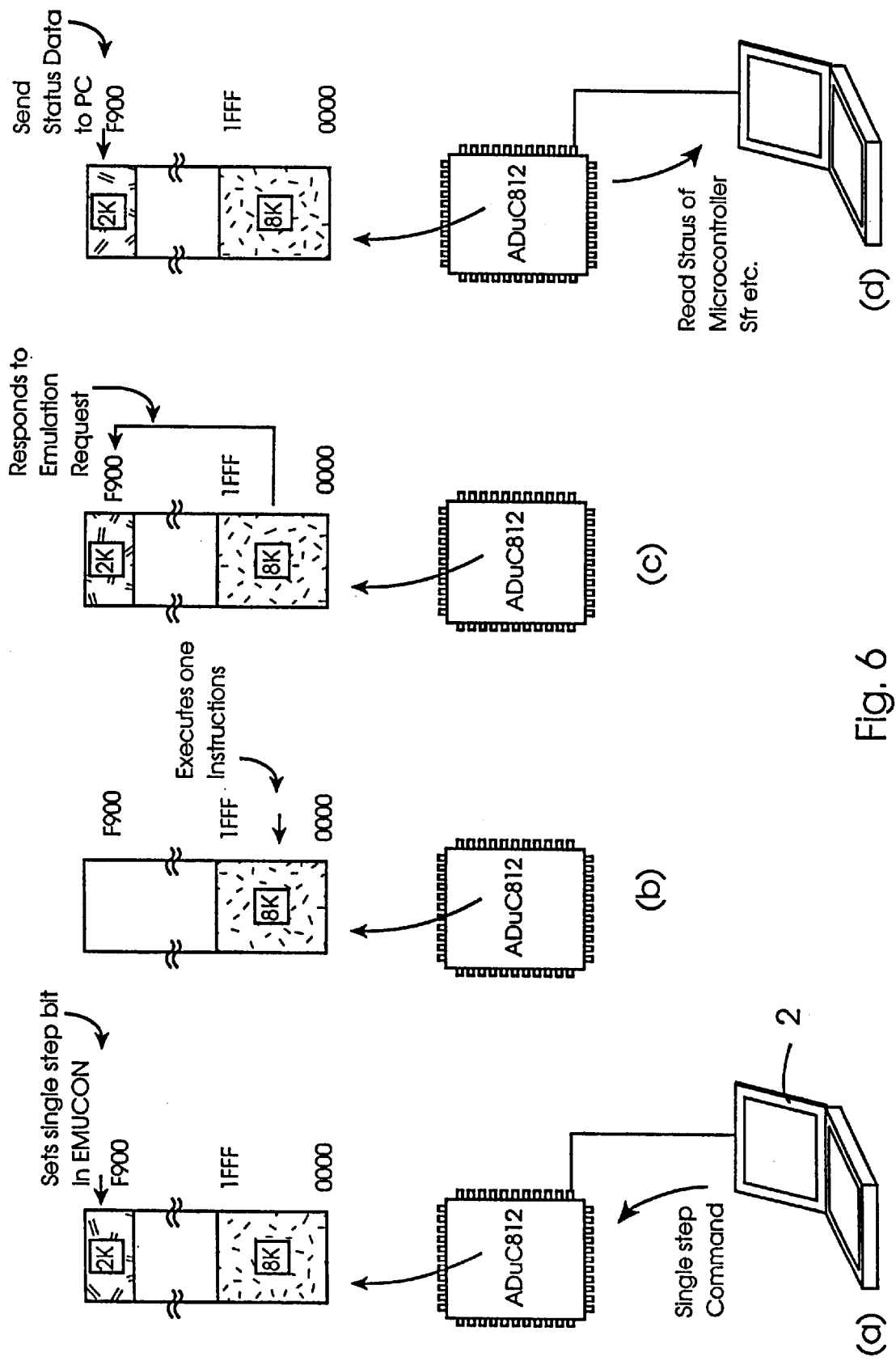
FIGS. 6a to 6d schematically an emulation in a single step mode.

Thus as shown in FIG. 6a, the emulation control data processor is arranged to issue an emulation request via the EA pin which causes a jump to the emulation memory. This initially allows communication between the emulation control data processor 2 and the emulator in order that new instructions can be set in the emulator, such as changing one or more of the flags in the EMUCON register, in this example, the control data processor sets the single step instruction, ESS, flag in the EMUCON register. Once the emulation control data processor has indicated that it does not wish to set any further instruction changes, control is relinquished from the emulation code and the user code is executed. However, since the EMUCON register was set with the single step enabled, and interrupt request is issued via the emulation controller 32 thereby causing control to be returned to the emulation code after a single instruction of the user code has been executed as shown in FIG. 6c. The emulation code then down loads data to the emulation control data processor 2 via the EA pin. Down loaded data may include the status of the internal registers of the data processor, but may also, depending on instructions received from the emulation control data processor, include the contents of the stack and also the contents of selected areas of internal or external memory, or the contents of an internal cache.

Figure 7:
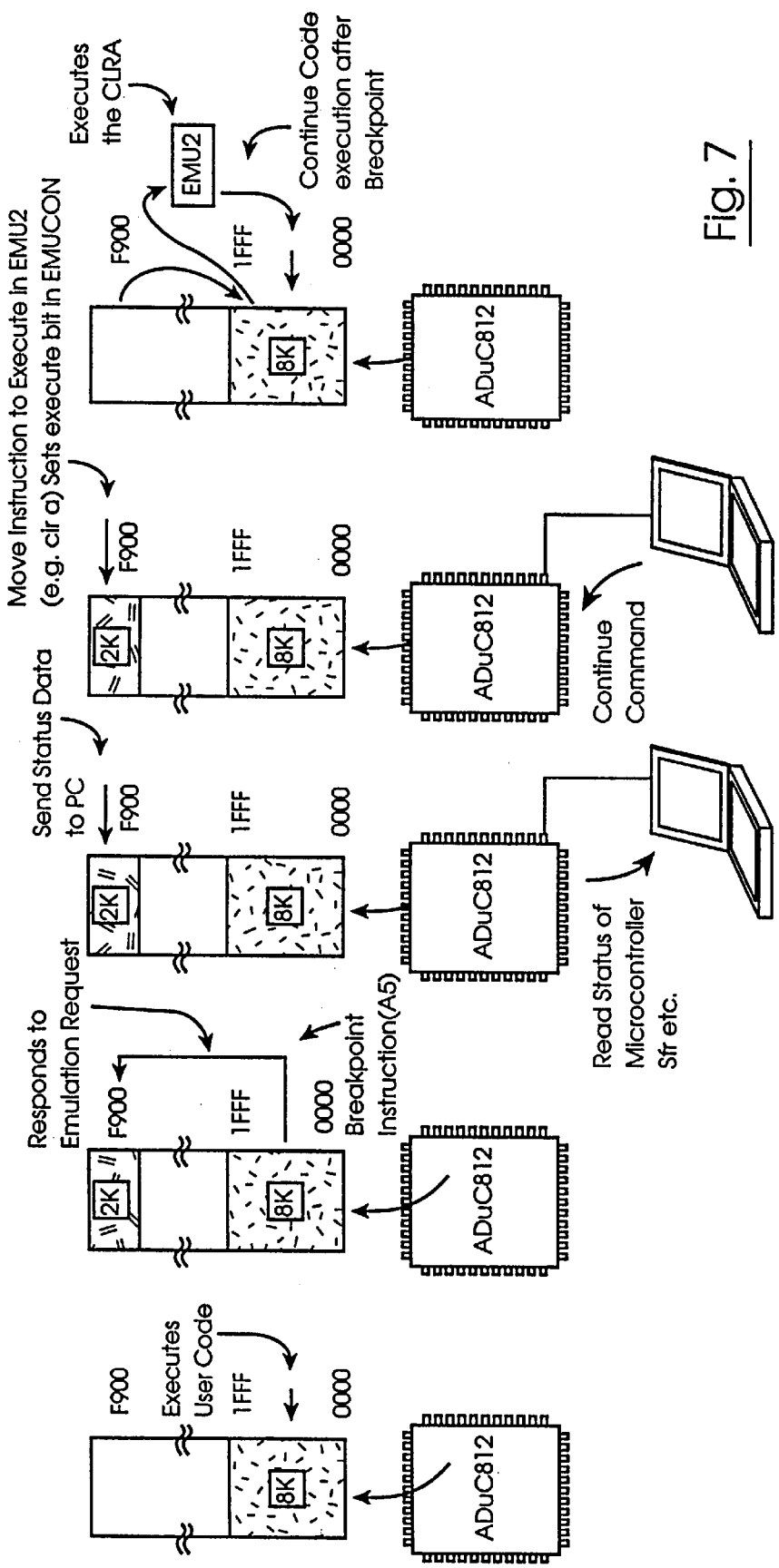
FIG. 7 schematically illustrates an emulation using a single step break point instruction.

FIG. 7 illustrates an example of an emulation request initiated via the break point instruction.

The data processor has a data processing core supporting the 8051 instruction set. The 8051 instruction set has a unused instruction code of A5. The A5 instruction has been implemented as the break point instruction.

It is known to initiate a software emulation or debug by including a jump instruction to the emulation code. However there is a significant problem with this approach since the jump instruction is a 3 byte instruction and if this was inserted at address 0120, as shown in FIG. 7 then the inc A and DAA instructions at addresses 0121 and 0122, respectively, would be overwritten by the jump instruction. Thus it would be necessary to change the addresses of the subsequent steps in order to incorporate the addition of this jump driven emulation instruction. Secondly, in order to use this approach, the emulation memory/programme must be visible for the jump to work and consequently the incorporation of the emulation code within the data processor would limit the user's programming options. A third problem is that, if the addresses of all the remaining code was not changed, it would result in the instructions at 0121 and 0122 being lost, and also an additional break point could not be inserted at the overwritten addresses.

By adding a single byte break point instruction, only one address of programme is over written. Thus in the example in FIG. 7 only the "clear A" instruction at 0120 is overwritten by the inclusion of the software driven emulation break point instruction. However, the clear A instruction is written into the EMU2 register in order to ensure that it is executed as if the break point instruction were not there. If a break point instruction is to be written into the user code for debugging/development purposes, the emulator reads out a block of memory containing the program code containing the address of the instruction to be changed. An internal memory controller then erases the block of memory, and in co-operation with the emulation control data processor, re-programs the block of memory adding the break point instruction. The precise memory control strategies for performing the modification of internal memory within the data processor, ie within a single chip package, are not critical to the present invention, but a suitable memory and memory controller is described within a co-pending application filed by Analog Devices, and titled "A MEMORY AND A DATA PROCESSOR INCLUDING A MEMORY". The interface element 3 may provide a local buffer such that as the block of program code (usually two rows on the internal non-volatile reprogrammable user code memory of the data processor), is buffered in the interface element and the local data processor modifies the data to change instructions or insert the break point, and then re-presents the data to the target data processor in order that it can rewrite the data into it's internal memory.

During execution of the user programme, the programme counter will eventually point to the address 0120 which has the A5 emulation break point instruction written therein in place of the "clear A" instruction. The instruction decoder of the data processor decodes the break point instruction and causes the emulation request controller 32 to issue a priority interrupt. Thus, the data processing core 54 discontinues execution of the user's programme and starts executing instructions from the emulation memory provided that the ESS bit in the EMUCON register cleared. Assuming that the EES bit is cleared, the data processing core executes the emulation instructions using the reserved EMU1 register, and outputs data concerning the status of the various programme registers to the emulation data processor 2. Once the data has been sent to the emulation data processor, the emulation data processor toggles the EES bit and issues a command causing the emulation to continue. The emulator then returns control to the user programme. Because the break point instruction is interrupt driven, the control is returned to address 0120 which holds the A5 break point instruction. This time the EES bit indicates that emulation should not be recommenced, but in fact that the instruction in the EMU2 register should be executed. The data processing core executes the instruction in the EMU2 register and returns control to the user programme at the address following the break point instruction.

Figure 9:
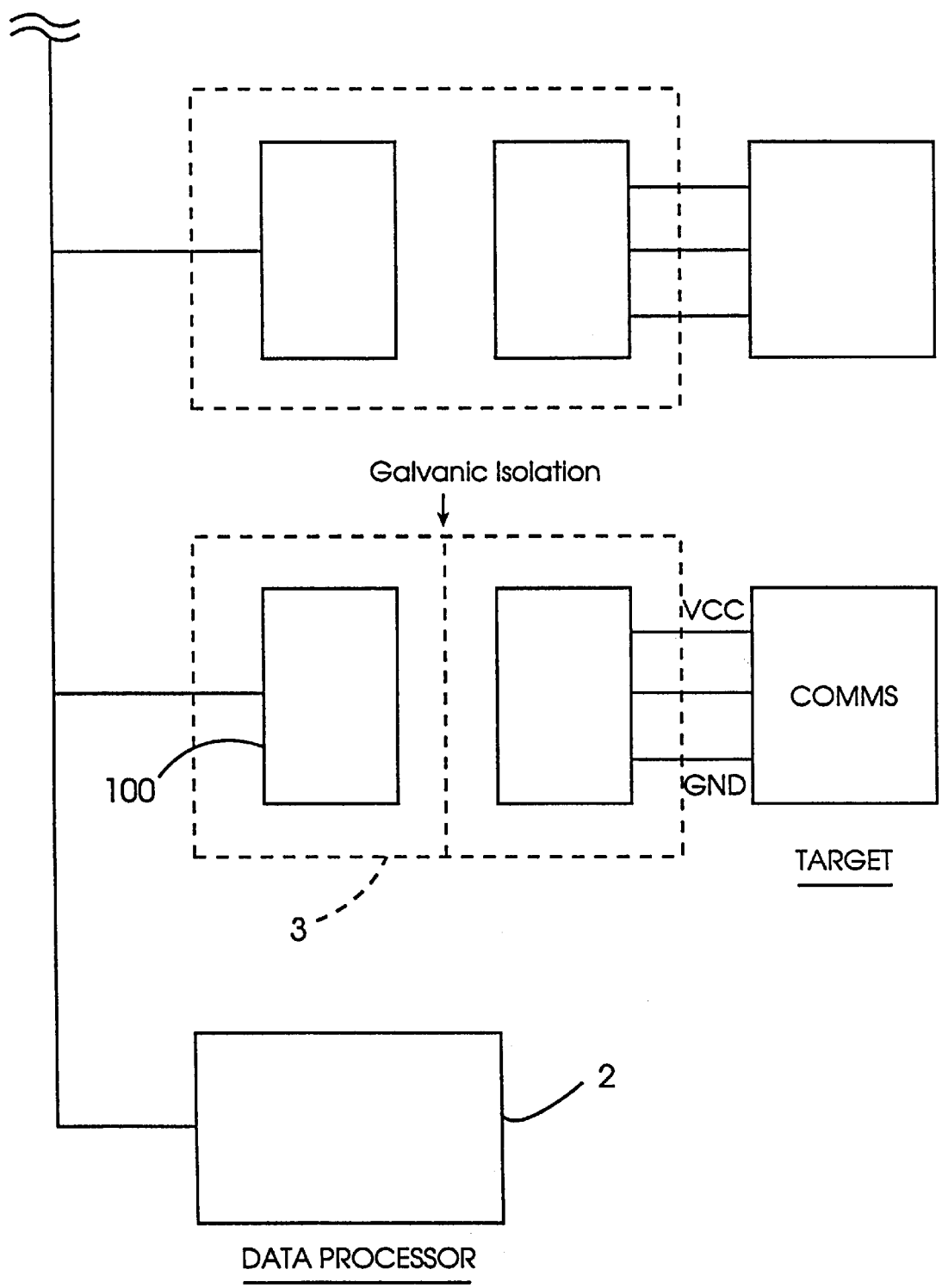
FIG. 9 schematically illustrates the emulation system.

FIG. 9 schematically illustrates a multi-target development system in which a single control data processor 2 communicates with a plurality of target data processors via a plurality of interface elements 3, each of which contain a local data processor 100 which reduces the computational load on the control data processor by performing the communications protocols and also buffers and modified data in the target data processors in response to commands from the emulation control data processor 2.

It is thus possible to provide a data processor having a software driven emulator embedded therein which uses dedicated registers, thereby ensuring that registers used in execution of a user's programme do not become altered once the emulation mode is commenced. It is also possible to provide a development system for use with such a microprocessor in order that the internal registers may be inspected, or blocks of memory may be inspected and analysis performed thereon. For example, a block of memory may hold values resulting from analogue to digital conversions. The values may be displayed by the emulator control data processor in order to form an oscilloscope trace of the analogue value, or additionally or alternatively may be Fourier transformed in order to perform frequency domain analysis. The emulator may be used to perform a software controlled series of Analogue to Digital conversions, and to send these to the emulator control processor which can then display a graph or trace of the converted variable. The emulator 2 may display a plurality of windows, with each displaying the status of and/or controlling the function of a respective target data processor within a multi-processor target board. Thus the operation of master and slave processors may be analysed, possibly on a single step basis, in order to check their data exchange operations and mutual performance.

The emulator has authority to modify the internal memory contents of program and data memory within the target data processor. Thus the target data processor may be re-programmed whilst it is in situ in the target board. Similarly calibration coefficients in digital or hybrid digital-analogue systems can be modified. It is also possible, when the interface element communicates using a radiative link, to leave the interface element attached to the target board permanently, thereby allowing for the target data processor to be re-programmed even after it has been installed in a working environment. The provision of an emulator as an integral part of the target data processor has the additional advantage that the board and processor being debugged/developed are identical to the final system. This contrasts with prior art emulators of the type shown in FIG. 1 whereby the data processor on the emulation pod synthesises the functions of the target data processor but in often a physically different type of processor which may have additional hardware attached thereto to simulate the ports of the target data processor.

What is claimed is:

1. A data processor including an emulation controller for causing the data processor to enter an emulation mode, and dedicated registers for use in the emulation mode wherein the emulation controller is responsive to an emulation instruction placed into a user program for causing the data processor to enter emulation mode, and wherein said emulation instruction replaces a pre-existing instruction and the instruction replaced by the emulation instruction is held in a dedicated register such that it can be executed upon return from the emulation mode.

2. A data processor as claimed in claim 1, in which the register containing the replaced instruction can only be altered when the data processor is in the emulation mode.

3. A data processor as claimed in claim 1, further comprising a non-volatile emulation memory for storing instructions to be performed by a data processing core of the data processor, and in which the emulation controller causes the data processing core to execute instructions from the emulation memory.

4. A data processor as claimed in claim 1, in which the emulation controller is further responsive to a signal on an emulator control terminal to initiate the emulation mode.

5. A data processor as claimed in claim 4, in which the signal is a voltage transition.

6. A data processor as claimed in claim 4, in which the control terminal is a pin of the data processor which is used to control other functions of the data processor during a predetermined operation thereof.

7. A data processor as claimed in claim 6, in which the predetermined operation is an initialisation sequence.

8. A data processor as claimed in claim 1, in which the emulation controller is further responsive to a control signal held in a storage element.

9. A data processor as claimed in claim 8, in which said control signal is a single step control signal which causes the data processor to only execute a single instruction of a user's programme before returning to the emulation mode.

10. A data processor as claimed in claim 8, in which said control signal is stored as a single bit within a register.

11. A data processor as claimed in claim 10, in which said register is an emulation control register for storing signals for controlling the functions executed in the emulation mode.

12. A data processor as claimed in claim 1, in which said emulation instruction is a single word instruction.

13. A data processor as claimed in claim 12, in which said emulation instruction is a single byte instruction.

14. A data processor as claimed in claim 12, in which the emulation instruction causes a jump to be performed from the user's programme to the emulation programme.

15. A data processor as claimed in claim 12, in which the emulation instruction causes an interrupt to be issued to the data processing core.

16. A data processor as claimed in claim 1, in which the emulation controller issues a priority non-maskable interrupt to a data processing core of the data processor in order to initiate the emulation mode.

17. A data processor as claimed in claim 1, in which the data processor includes an emulation control register containing bits for controlling at least one function selected from a list comprising: halting of counter and timers internal to the data processor; single step operation; enabling the interrupt mode to be initiated by an emulation instruction within the user's code; and executing an instruction held in an instruction register, said instruction corresponding to the instruction that was overwritten by the insertion of the emulation instruction into the user's programme.

18. A data processor as claimed in claim 1, in which the registers used during execution of user's programme instructions are left unaltered during emulation mode.

19. A data processor as claimed in claim 1 in which the contents of registers used during execution of a user's programme are read and output via a data link during emulation mode.

20. A data processor as claimed in claim 19, in which the contents of at least one of the stack and the programme counter of the data processor are read and output via the data link.

21. A data processor as claimed in claim 16, in which, the contents of the programme counter are pushed onto the stack at the commencement of the emulation mode.

22. A data processor as claimed in claim 16, in which an emulation stack and an emulation programme counter are provided for use by the data processing core during the emulation mode.

23. A data processor as claimed in claim 1, in which data from the emulator is output as a serial data stream using only a single pin.

24. A data processor as claimed in claim 1, in which the emulator is responsive to an external emulator control device to output information upon command, said information comprising at least one item from a list comprising: the contents of at least one register of the data processor; the contents of a stack of the data processor; the contents of a programme counter of the data processor; the contents of a selected memory address; and the contents of a selected block of memory addresses.

25. A data processor as claimed in claim 1, in which a program for controlling the operation of the data processor during emulation is stored in a reserved non-volatile memory which is hidden from the user of the data processor.

26. A data processor including an emulation controller for causing the data processor to enter an emulation mode, wherein the emulation controller is responsive to an emulation break point instruction overwriting an instruction of a user program resident in program memory.

27. A data processor as claimed in claim 26, in which the program memory is a non-volatile re-programmable memory arranged such that a block of program code can be read out from the memory, modified to insert said emulation break point and then rewritten to the program memory.

28. A data processor as claimed in claim 26, in which the length of the user program remains unchanged when the emulation break point instruction is inserted.

29. A data processor as claimed in claim 27, in which, upon return from the emulation mode, the data processor executes the instruction which was overwritten and which is held in said dedicated register.

30. A data processor as claimed in claim 27, in which said instruction which is overwritten is held in a special purpose register such that, upon return from the emulation mode, the instruction held in the register is executed.

31. A data processor as claimed in claim 1, in which the data processor returns from emulation with its registers unchanged, except for the special purpose register used in the emulation mode.

32. A data processor as claimed in claim 27, in which the data processor returns from emulation with its registers unchanged, except for the special purpose register used in the emulation mode.

33. An integrated circuit comprising a data processor operable in a first mode to execute a user's program and in a second mode to debug the user's program and in which the data processor executes code stored in an emulation memory when the data processor is operating in the second mode.

34. An integrated circuit as claimed in claim 33, further comprising dedicated registers for use in the emulation mode.

35. An integrated circuit as claimed in claim 33, in which, upon return from the second mode, the registers used in the first mode are as they were immediately prior to entering the second mode.

36. A data processor operable in a first mode to execute user code stored in a non-volatile user code memory and in a second mode to execute code stored in an internal reserved memory, wherein the user code is re-programmable while the data processor is in the second mode and in the second mode, the data processor acts to allow the user code to be debugged.

37. A data processor as claimed in claim 36, in which the second mode is a debug mode which is entered by the occurrence of a debug break point instruction in the user code.

38. A data processor as claimed in claim 36, in which the reserved memory is hidden from the user.

39. A data processor as claimed in claim 36, in which said data processor is arranged to communicate with an external device while in said second mode using a serial communication link.

40. A data processor as claimed in claim 36, in which said serial communication link comprises a single pin.

41. A data processor as claimed in claim 40, in which said single pin is used to control other functions of the data processor during a predetermined operation thereof.

42. A data processor as claimed in claim 40 in which the predetermined operation is an initialization sequence.

43. A method of reprogramming an integrated circuit containing a data processor, a first memory region for containing a user's code and a second, internal memory region for containing an emulation code, and wherein the data processor is operable in a first mode to execute code from the first memory, and in a second mode to execute emulation code from the second memory, which emulation code instructs the data processor to obtain new code to modify the user's code and allow the user code to be debugged.

44. A data processor operable in a first mode to execute the user code from an integrated memory, and in a second mode to execute debug code stored in an integrated non-volatile reserved memory; in which in the second mode the data processor executes instructions to communicate its internal status to an external development system and receive data and command information from the development system, where said communication is bi-directional via only a single terminal.

45. A data processor according to claim 44, in which the single terminal is an existing pin of the data processor.

46. A data processor according to claim 44, in which the second mode is entered by the occurrence of a break point instruction in the user code.

47. A data processor according to claim 44, in which the reserved memory is hidden from the user.

48. A data processor according to claim 44, in which said single terminal provides a control function of the data processor during the first mode.

49. A data processor according to claim 48, in which the single terminal controls the operation of the data processor during an initialization sequence.

50. A data processor according to claim 44, where the development system is a PC.

51. A data processor according to claim 44, where the data processor is an 8-bit microcontroller.

52. A data processor according to claim 44, wherein the user code is stored in Flash EEPROM.

53. A data processor according to claim 52 wherein the Flash EEPROM can be re-programmed whilst the data processor is in the second mode.

54. A method of debugging a data processor wherein the data processor is operable in a first mode to execute user code from an integrated memory, and in a second mode to execute debug code stored in reserved integrated memory; and in which in the second mode the data processor executes instructions to communicate its internal status to an external development system, and receive data and command information from the development system, where said communication is bi-directional via only a single terminal.

* * * * *